United States Patent [19]

Gerber

[11] Patent Number: 5,677,751
[45] Date of Patent: Oct. 14, 1997

[54] DECALS FOR MULTIFOCALS

[76] Inventor: Neil Gerber, 68-21 Bell Blvd., Bayside, N.Y. 11364

[21] Appl. No.: 273,113

[22] Filed: Jul. 11, 1994

[51] Int. Cl.$^6$ .................................................... A61B 3/00
[52] U.S. Cl. .................. 351/246; 351/204; 351/228
[58] Field of Search .................................. 351/204, 222, 351/227, 228, 246, 247, 57, 58, 168, 169, 171, 172, 177, 178

[56] References Cited

U.S. PATENT DOCUMENTS

| | | | |
|---|---|---|---|
| 1,675,407 | 4/1928 | Dvorine | 351/204 |
| 1,750,731 | 3/1930 | Smith | 351/204 |
| 1,751,425 | 3/1930 | Smith | 351/204 |
| 1,981,439 | 11/1934 | Smith | 351/228 |
| 2,632,257 | 3/1953 | Belgard | 351/204 |
| 3,987,554 | 10/1976 | Pastore | 33/200 |
| 4,196,978 | 4/1980 | Johnson | 351/204 |
| 4,244,639 | 1/1981 | Kanda | 351/204 |
| 4,505,043 | 3/1985 | Sztuka | 33/174 A |
| 4,531,297 | 7/1985 | Stoerr | 33/200 |
| 4,653,192 | 3/1987 | Conrad et al. | 33/200 |
| 5,037,193 | 8/1991 | Funk | 351/204 |
| 5,153,619 | 10/1992 | Nix | 351/57 |
| 5,167,074 | 12/1992 | Weiss | 33/200 |

FOREIGN PATENT DOCUMENTS

| | | | |
|---|---|---|---|
| 1100148 | 4/1966 | European Pat. Off. | 351/228 |
| 0018255 | 3/1911 | United Kingdom | 351/228 |

OTHER PUBLICATIONS

Troy E. Fannin, et al., Clinical Optics, 1987 285–286.

*Primary Examiner*—William L. Sikes
*Assistant Examiner*—James A. Dudek
*Attorney, Agent, or Firm*—Steven Horowitz

[57] ABSTRACT

A method of using decals peeled off a tape dispenser to measure eyeglass wearers for bifocals, trifocals and progressive bifocals is disclosed. The decals adhere to the lens of plastic demonstration spectacles either by suction, friction or transparent adhesive liquid on a reverse side. The decals come in varying sizes reflecting the varying widths and styles of eyeglass frames. The decals can also be flat topped or round in shape. The method involves placing the decal on demonstration lens worn by the patient and repositioning it if necessary so that its top coincides with the top of the lower eyelid of the patient. If desired, the practitioner can first crudely estimate the distance from the top of the lower eyelid to the bottom of the lens with demonstration spectacles on the wearer and then attach and position the appropriate size decal on the demonstration lens so that the top of the decal coincides with the top of the lower eyelid of the patient. In either case, the method requires little skill and hence reduces inaccuracy and also allows the patient to test the bifocals or trifocals before their manufacture.

14 Claims, 3 Drawing Sheets

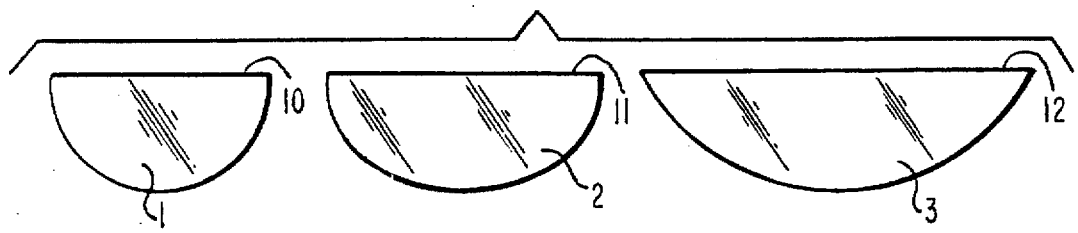
FIG.1A
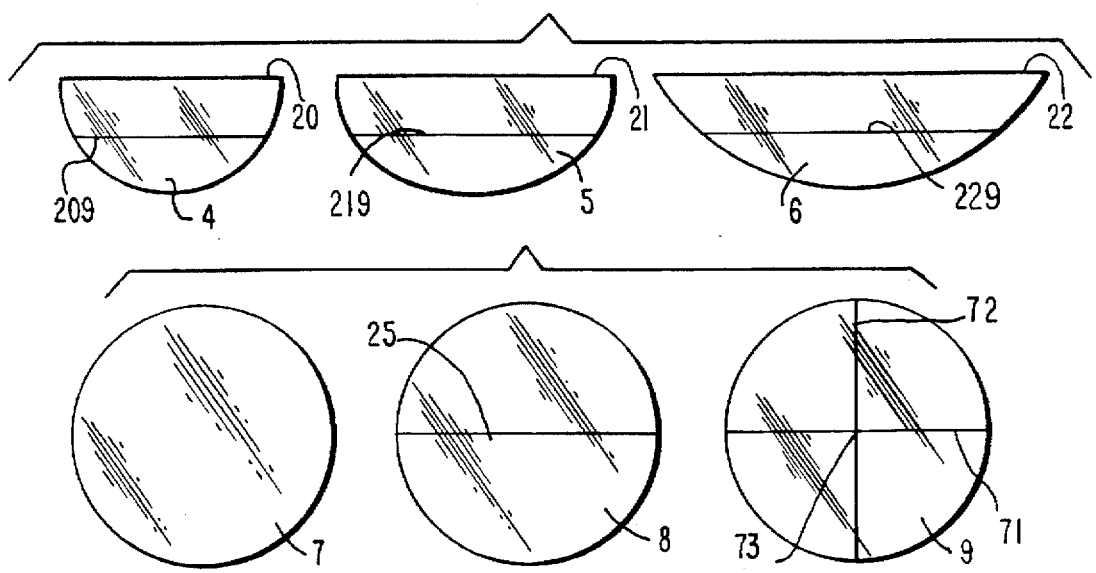
FIG.1B
FIG.1C
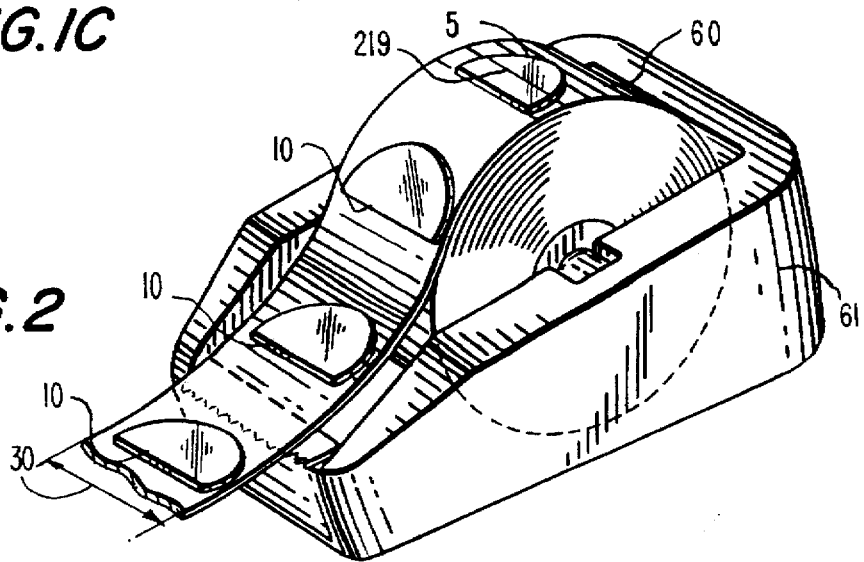
FIG.2

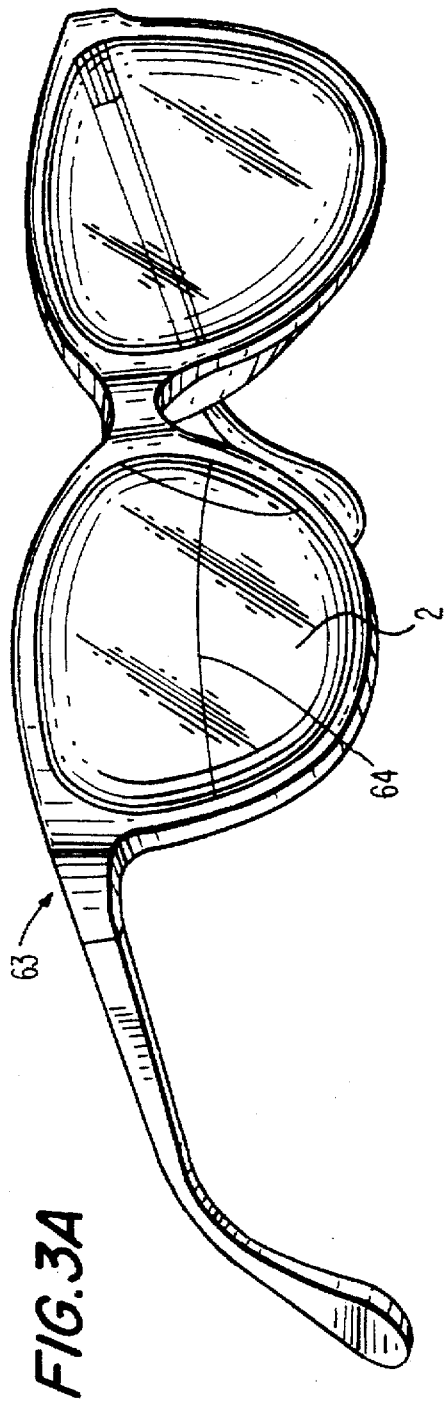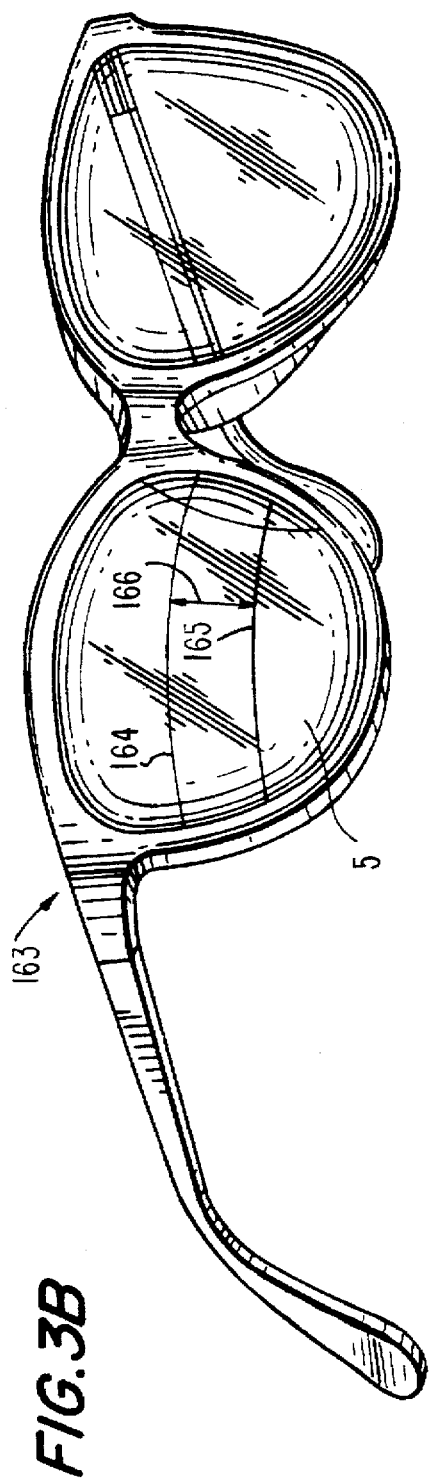
FIG.3A
FIG.3B

DECALS FOR MULTIFOCALS

BACKGROUND OF THE INVENTION

The present invention relates to eyewear, and in particular to a method and apparatus of bifocal and trifocal segment demonstration that enhances the accuracy of the measurement and significantly reduces the skill needed to perform the measurement used to fit patients with bifocals and other multifocals.

Bifocal and trifocal eyewear provide two or more corrective lens of different focal lengths for the eyes. Typically, the bifocal segment is at the bottom of the eyeglass lens and is used for close-up work such as reading and the remaining upper segment is for distance. The bifocals wearer sees a line dividing the two segments. For trifocals, the upper segment is for distance, the middle segment is for intermediate distance viewing and the lower segment is for reading. The trifocals wearer sees two lines dividing the three segments. For "progressive bifocals" there are three divisions, as with trifocals, but there is no line dividing the sections—rather there is a gradual change in the feature of the lens from "reading" to "intermediate" to "distance".

It is extremely important that the segment height of bifocals and trifocals, which is determined in millimeters, be precisely determined so that the segment can be properly positioned with respect to the corrective lens and in relation to the line of sight. Otherwise, if for example the segment height, as determined from the bottom of the lens to the horizontal line at the top of the bifocal segment, is slightly short, the patient will have to raise his or her head back slightly to compensate and thereby make proper use of the bifocal segment. The resulting strain and/or stiff neck would then significantly diminish the satisfactory performance of the eyeglasses.

At present, a patient is measured for bifocals by using a ruler, pupillary distance stick or similar device to measure the distance between the bottom of the lens to the top of the lower eyelid. Alternatively, some kind of tape may be placed on the lens and then taken off and measured. In either case, this is done while the patient is wearing the eyeglass frame that he or she has chosen. Furthermore, the patient is unable to try out the position of the bifocal segment until after he or she receives the glasses fitted with the bifocals. Accordingly, the patient must attempt to sit motionless while being measured and the measurement is often not precisely accurate to the millimeter.

What often happens is that the patient is measured and on the basis of measurements the bifocal segment is manufactured and put into the lens. The patient then begins wearing the glasses and only then determines in some cases that the height of the bifocal segment line is slightly lower or higher than it should be. The patient then returns to the practitioner with this complaint and new bifocals have to be manufactured, adding to the cost to the patient.

U.S. Pat. No. 5,037,193 to Funk makes an attempt to solve these problems by attempting to provide a bifocal segment demonstration and measuring apparatus that permits the patient to test the position of the bifocal segment before its manufacture. In Funk, a bifocal segment coupled to a ruler stick attaches to the eyeglass frame while being worn by the patient. The bifocal segment in Funk, however, is only a fraction of the actual bifocal segment's width and height. The top of the bifocal segment in Funk does not even stretch across the entire length of the eyeglass frame. This impedes the wearer's ability to fully test out the feel and therefore the correct position of the bifocal segment as compared to how it will be when he or she is wearing the actual bifocals.

More importantly, Funk fails to solve or even address the other critical drawback of the prior art. In Funk, as in the other prior art, significant skill and effort is needed to attempt to precisely measure the height of the bifocal segment while the wearer attempts to remain motionless so as not to disturb the measurement and destroy its accuracy. Finally, in Funk, one is limited as to how low in height the segment can be because the measuring apparatus can only slide just so far down without bumping into the holding means of the apparatus. There is no such limitation with the present invention.

One of the aims of the present invention is to overcome the disadvantages of the prior art and provide a precise measurement method of the bifocal or trifocal segment as it will be in the actual lens and to provide such a method that does not require the patient to remain motionless at the risk of affecting the measurement's accuracy. This invention thereby revolutionizes the practice of optometry or optical stores by allowing a relatively unskilled person to assist the patient in choosing bifocals.

SUMMARY OF THE INVENTION

It is an object of the present invention to provide a method and apparatus for precisely measuring patients for bifocals, trifocals and other multifocals by allowing the patient to truly test the position and feel of the bifocal segment in the lens in advance of manufacture.

It is a further object of the present invention to provide an incredibly simple yet precise measurement method for bifocals, trifocals and other multifocals that requires little skill on the part of the measurer, need not require optical tools or implements and leaves little or no chance of error.

It is another further object of the present invention to enable a practitioner to demonstrate to a patient the effect of having bifocals or trifocals on existing prescription spectacles by affixing to the prescription spectacles a correspondingly shaped decal with the desired bifocal segment height.

It is also an object of the present invention to provide a method of measuring a wearer for progressive bifocal lenses by applying to demonstration spectacles a round decal containing visible perpendicularly intersecting lines that bisect the decal and meet at a central point and then positioning this decal so that the intersection is exactly over the center of the wearer's pupil.

The method of the present invention involves preparation of an assortment of thirty sizes of transparent soft plastic decals for each eyeglass frame style. These transparent soft plastic decals would differ only in their width or shape, which would correspond to the range of bifocal segment widths and shapes that are manufactured. In terms of shape, the most common types are flat top and round. Thus, the flat top decal, which extends the full width of the bifocal segment, would conform exactly to the shape of the bifocal segment in a particular style eyeglass frame.

When a patient is to be fitted with bifocals, the patient need only choose the width and shape, i.e., style, he or she desires and then the height of the bifocal segment that is comfortable and appropriate for the patient can be determined by the method described below. The transparent decal corresponding to that width and shape would be peeled off a roll of soft plastic paper and fitted onto a demonstration eyeglass lens. The decal adheres to the roll of paper simply by the friction and/or suction effect of soft plastic adjacent to plastic without the need for adhesive.

When applied to the demonstration lens the transparent decal would leave visible only a horizontal line stretching across the lens corresponding to the precise location of the line that would appear if the actual bifocal segment had been manufactured and fitted into the lens. The line would thus mark the height of the bifocal segment. Accordingly, the patient is initially fitted with a demonstration lens that duplicates the effect of the actual finished bifocals he will receive, thus largely eliminating the chance of the patient coming back to complain about the lens after it is manufactured and he or she starts to wear it.

BRIEF DESCRIPTION OF THE DRAWINGS

FIG. 1a is a top plan view of an assortment of widths and shapes of the transparent plastic decals for bifocals in a particular spectacle frame design.

FIG. 1b is a top plan view of an assortment of widths and shapes of the transparent plastic decals for trifocals in a particular spectacle frame design.

FIG. 1c is a top plan view of, from left to right, a round bifocal decal of the present invention, a round trifocal decal of the present invention and a round decal of the present invention used for progressive bifocals.

FIG. 2 is a perspective view of the decals of the present invention being peeled off a roll of tape in a tape dispenser.

FIG. 3a is a perspective view of the bifocal decal of the present invention attached to a demonstration lens.

FIG. 3b is a perspective view of the trifocal decal of the present invention attached to a demonstration lens.

DETAILED DESCRIPTION OF THE PREFERRED EMBODIMENT

Figure 4A:
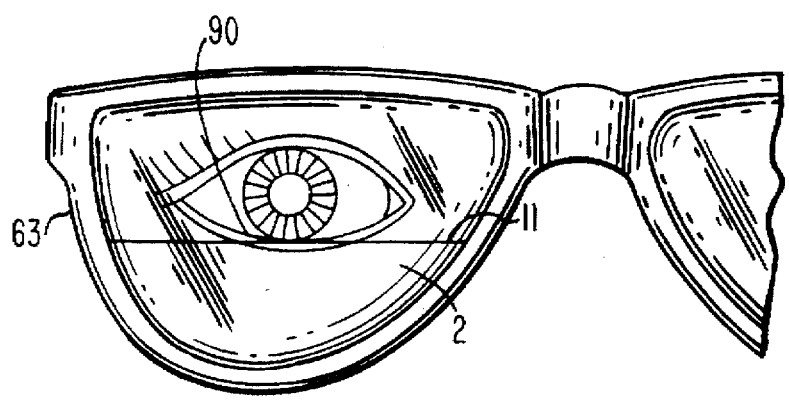
FIG. 4a is a front view of a flat top bifocal decal of the present invention shown attached to a demonstration lens in relation to the lower eyelid of the wearer.

In FIG. 1a there is shown a top plan view of an assortment of sizes of bifocal segments in the form of decals labeled 1,2 and 3. There are a total of thirty sizes for each frame design, only three of which are shown in FIG. 1a. Each of the thirty decals differs either in its width and/or the shape of its curved portion (as necessary to conform to various spectacle frame designs) and each decal can also be either flat-topped or round. The widths of three different flat-topped bifocal decals are illustrated by lines 10, 11 and 12.

FIG. 1b shows a top plan view of an assortment of sizes of trifocal segments in the form of decals labeled 4, 5 and 6. Likewise, there are a total of thirty sizes for each frame design for trifocals also. The widths of the three flat-topped trifocals are illustrated by lines 20, 21 and 22.

FIG. 1c is a top plan view of an assortment of round decals of the present invention. The left decal 7 is for bifocals, the middle decal 8 is for trifocals and the right decal 9 is for progressive bifocals.

The bifocal and trifocal decals 1,2,3,4,5,6,7,8,9 are made of clear transparent soft plastic. If the bifocal segment is flat top shape, as in decals 1,2,3, the shape of its decal will generally conform to the outline or border of the spectacle frame below the top of the bifocal segment. As such, the top of the plastic, for example lines 10,11,12,20,21,22 of decals 1,2,3,4,5,6, is a straight horizontal line. The distance in millimeters from the top of the line to the bottom of the plastic corresponds to the height of the bifocal segment. As shown in FIGS. 3a and 3b, since the decal will be entirely transparent, when it is attached to the spectacle lens it will have the effect of putting a thin horizontal line 64 across the demonstration lens at the height corresponding to a bifocal segment, in the case of bifocals, or two lines, 164, 165, in the case of trifocals.

The decals of the present invention are approximately a quarter of a millimeter thick, having the approximate thickness of a sheet of paper.

As seen in FIG. 2, the decals, which adhere without adhesive due to the friction and/or suction effect of plastic next to plastic, can be easily peeled off a plastic tape 60 contained in an ordinary tape dispenser 61. The suction and/or friction force is created when the soft plastic decal adheres to a surface of the plastic or glass demonstration spectacles after the decal is placed adjacent to and pressed against the plastic or glass lens of the demonstration spectacles so as to create an air-tight fit. Accordingly, the decal's position, as explained in detail below, can be repeatedly adjusted after adherence to the lens of a demonstration spectacle without smearing and without leaving a film of glue or water on the lens. This increases the ability of the decal of the present invention to simulate to the patient in advance the effect and feel of an actual multifocal segment that will only later be manufactured. In a preferred embodiment, as illustrated by line 30, the tape should be approximately one inch wide. After being peeled off the tape 60, the decals of a particular spectacle design can be affixed to a demonstration lens corresponding to that design. This is seen in FIG. 3a where a bifocal segment decal 2 is affixed to a demonstration lens. In FIG. 3b a trifocal segment decal 5 is affixed to a demonstration lens.

Accordingly, in order for the practitioner to determine the appropriate height for a bifocal segment in a spectacle lens, the practitioner first has the patient select the width and shape of the spectacle frame and the type of bifocal segment, i.e., flat top or round that he or she prefers based on discussions with the practitioner concerning what is appropriate. Out of the thirty possible widths and shapes of decals, the practitioner selects the bifocal segment decal that closely matches the spectacle width and shape selected by the wearer. If the practitioner chooses to, he can first measure the patient with a ruler or other crude measuring tool to obtain a crude measurement for the distance between the top 90 of the lower eyelid and the bottom of the lens 200. As will be seen, in contrast to the prior art, if this is done at all it is not at all necessary that this initial measurement be precisely accurate.

Figure 4B:
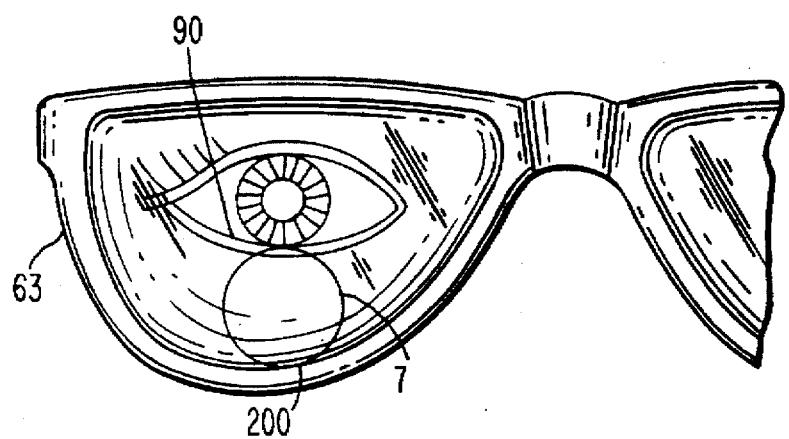
FIG. 4b is a front view of a round bifocal decal of the present invention shown attached to a demonstration lens in relation to the lower eyelid of the wearer.

In either case, the practitioner peels off the appropriate decal from the decal tape 60 located in the tape dispenser 61 and applies it to a demonstration lens 63 of the design selected by the patient while he or she has the demonstration spectacles on. The decal is affixed on the demonstration spectacles and positioned so that its top (either its horizontal line in the case of a flat top decal or its top point in the case of a round decal) corresponds to the top 90 of the lower eyelid of the wearer. As illustrated by FIGS. 4a and 4b, the practitioner can then observe the patient through the demonstration bifocals and determine by sight or other method if the bifocal segment line crosses the top of the lower eyelid.

Alternatively, if the practitioner had first taken a crude measurement, the spectacles 63 are removed from the wearer and the decal 1,2,3,4,5 or 6 is applied and positioned so that the distance from its top (which is the flat horizontal line or in the case of round decals the top of the circle) to the bottom 200 (see FIG. 4b) of the spectacle lens 63 corresponds to the initial measurement. The patient then puts the demonstration spectacles 63 with the decal attached to it back on and thereby experiences what it would be like to actually wear nonprescription bifocal spectacles with the bifocal line at a specific height. More importantly and as before, as illustrated by FIGS. 4a and 4b, the practitioner can then observe the patient through the demonstration bifocals and determine by sight or other method if the bifocal segment line crosses the top of the lower eyelid.

FIGS. 4a and 4b depict the view that the practitioner will have of the demonstration bifocals in relation to the top 90 of the lower eyelid of the patient. If, by way of example, a flat top bifocal 2 is selected, and the line at the top of the bifocal segment crosses below the top of the patient's lower eyelid, the practitioner, after appropriate discussions with the patient, can adjust the line slightly upward by simply removing the bifocal decal and reattaching it at a slightly higher point in the lens of the same demonstration bifocal spectacles. In some case after adjustments the decal may extend below the bottom 200 of the lens of the spectacle frames 63 and in some cases after adjustments the bottom of the decal may not reach the bottom 200 of the lens of the spectacles 63.

Significantly, the decals of the present invention are designed to be easily removed from and attached to a demonstration lens 63 (which is typically made from hard plastic). If the initial attempt to position the decals results in their being too low or too high with respect to the top 90 of the wearer's lower eyelid, the practitioner simply removes the decal from the demonstration lens and reattaches it at a higher location if it was too low or a lower location if it was too high. Then the practitioner once again observes the patient through the demonstration bifocals to determine if the bifocal segment line now crosses the top 90 of the patient's lower eyelid.

In this way, the practitioner will be able to provide bifocals with precise positioning of the segment height, accurate to within one half of a millimeter. FIG. 4a illustrates the correct positioning of the bifocal segment since the top 11 of the flat top bifocal 2 exactly crosses the top 90 of the lower eyelid of the wearer just below the center of the eye. The important thing is that all these adjustments are being done prior to the bifocals or multifocals ever being manufactured. Thus the danger that the patient will purchase bifocals and then complain about them and have to purchase new ones is effectively eliminated. In addition, very little skill was necessary and little or no measuring was needed.

As shown in FIG. 4b, if the bifocal shape selected is round, the practitioner uses the same procedure except that the practitioner uses the top of the circumference of the circular decal as the reference point instead of using the flat horizontal line as the reference. In other words, when the decal 7 is affixed to the demonstration lens 63 and the wearer has the spectacles on, the practitioner peers through the demonstration lens and observes whether the top of the round bifocal decal 7 exactly meets the top 90 of the wearer's lower eyelid. If not, he makes the same adjustments as with the flat top bifocal 2 by removing the decal 7 and repositioning it on the spectacles 63.

The procedure described herein for selection of bifocals may be used for selection of trifocals also except that there will be two lines 164, 165 as opposed to one. Nevertheless, for trifocals, as seen in FIG. 3b, the practitioner need only check the positioning of the top line 164 (of the two visible lines 164, 165) and this is accomplished by looking at the area of the iris below the patients's pupil. The lower line 165 is automatically set at a prescribed distance 166 below the upper line, usually about seven millimeters. For trifocals, the practitioner thus compares the top line 164 to the area of the iris below the wearer's pupil to properly align the segment. Although the point of reference for trifocals is less precise than that for bifocals, this in accordance with standard practice of opticians, the method of the present invention is still essentially the same. Alternatively, for trifocals, the practitioner can also compare the same reference point as with bifocals, namely the top of the lower eyelid.

The method and apparatus of the present invention is also unique and has the added advantage that instead of nonprescription demonstration spectacles, the decals can actually be affixed to the patient's existing prescription eyeglasses. In this way, the patient can test out the feeling of bifocals in conjunction with actual prescription glasses. This can all be done before the bifocals or multifocals are even manufactured.

Figure 5:
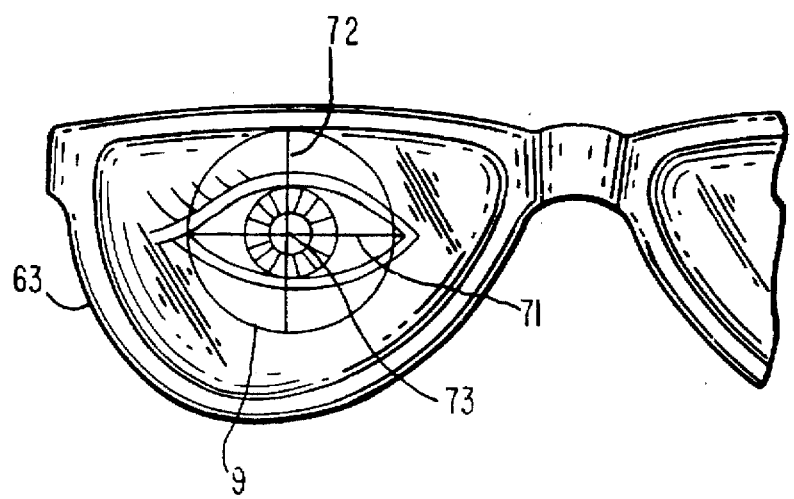
FIG. 5 is a front view of a progressive bifocal decal of the present invention shown attached to a demonstration lens in relation to the pupil of the wearer.

As shown in FIG. 5 (and FIG. 1c), the decals of the present invention can also be used to measure the wearer for progressive bifocals. With progressive bifocals, which do not have a visible line, the decal 9 will have two bisecting lines, horizontal line 71 and vertical line 72, which meet at a point 73. For progressive bifocals, the method of the present invention is different. Progressive bifocals are manufactured around a central point that should correspond with the center of the wearer's pupil.

For progressive bifocals, after the wearer selects the spectacle shape desired and puts the spectacles on, with the demonstration lens on the wearer but without any decal attached, the practitioner marks the point on the lens corresponding to the center of the wearer's pupil 73 using a writing instrument or other marker. Then the practitioner affixes the round decal 9 containing bisecting lines to the demonstration lens so that the point 73 where the visible intersecting lines meet is exactly over the center of the wearer's pupil 73.

The decals of the present invention can also be used for tinted contact lens simulation. The decals would thus be manufactured identical in material to the decals depicted in FIG. 1. The difference is that they would be designed in the shape and size of contact lenses and would come in various tints. They could then be peeled off in the same manner as the bifocal decals and can be affixed to demonstration spectacles. In this way, the patient would be able to try out the tinted contact lenses without having to learn how or take the time and effort to actually put the lenses in the eye. In addition, no danger of infection would result from trying on lenses and placing them in contact with tears, which are body fluids. Furthermore, the effect of the affixed decal in the size of the contact lens would be more accurate simulation of looking through tinted contact lens than trying on tinted demonstration spectacles.

The present invention is not limited to the embodiments and methods described and represented and it is adaptable to numerous variants available to someone skilled in the art, without departing from the spirit and scope of the invention.

I claim:

1. A method of fitting a wearer with properly positioned multifocal lenses, the method comprising the steps of:
   (1) having a wearer put on demonstration spectacles of a design that the wearer selects;
   (2) estimating a distance from a top of a lower eyelid of the wearer to a bottom of a lens in the spectacles and then removing said spectacles;

(3) taking a semicircular flat topped decal corresponding in width and shape to that of the demonstration spectacles, affixing the decal to the spectacle lens so that the distance from the top of the decal to the bottom of the spectacle lens equals the estimated distance and having the wearer put the spectacles back on;

(4) comparing by observation a horizontal line formed by a flat top of said decal with an imaginary line tangent to the top of the lower eyelid and determining if there is a gap between said lines; and (5) if a gap is found, repositioning the decal so that its flat top coincides with said imaginary line and if necessary repeating steps 4 and 5 until the gap disappears.

2. A method of fitting a wearer with properly positioned multifocal lenses, the method comprising the steps of:

(1) having a wearer put on demonstration spectacles of a design that the wearer selects;

(2) taking a semicircular flat topped decal corresponding in width and shape to that of the demonstration spectacles, affixing the decal to a lens of the demonstration spectacles so that as closely as possible the flat top of the decal is tangent to a lowest point of a top of a lower eyelid of the wearer while the decal is held parallel to the length of the eye;

(3) comparing by observation the flat top of said decal with an imaginary line tangent to the lowest point of the top of the lower eyelid and determining if there is a gap between said lines; and (4) if a gap is found, repositioning the decal so that its flat top coincides with said imaginary line and if necessary repeating steps 4 and 5 until the gap disappears.

3. A method of fitting a wearer with properly positioned multifocal lenses, the method comprising the steps of:

(1) having a wearer put on demonstration spectacles of a design that the wearer selects;

(2) estimating a distance from a top of a lower eyelid of the wearer to a bottom of a lens in the spectacles and then removing said spectacles;

(3) taking a round decal corresponding in width and shape to that of the demonstration spectacles, affixing the decal to the spectacle lens so that the distance from the top point of the decal to the bottom of the spectacle lens equals the estimated distance and having the wearer put the spectacles back on;

(4) comparing by observation a first imaginary line tangent to the top point of said round decal with a second imaginary line tangent to the top of the lower eyelid and determining if there is a gap between said lines; and (5) if a gap is found, repositioning the decal so that its top point coincides with said second imaginary line and if necessary repeating steps 4 and 5 until the gap disappears.

4. A method of fitting a wearer with properly positioned multifocal lenses, the method comprising the steps of:

(1) having a wearer put on demonstration spectacles of a design that the wearer selects;

(2) taking a round decal and affixing the decal to a lens of the demonstration spectacles so that as closely as possible a top point of the decal coincides with a lowest point of a top of a lower eyelid of the wearer while a bottom point of the decal touches a bottom of the lens;

(3) comparing by observation the top point of said decal with an imaginary line tangent to the lowest point of the top of the lower eyelid of the wearer and determining if there is a gap between said point and said imaginary line; and (4) if a gap is found, repositioning the decal so that its top point coincides with said imaginary line and if necessary repeating steps 3 and 4 until the gap disappears.

5. A method of fitting a wearer with properly positioned progressive bifocal lenses, the method comprising the steps of:

(1) having a wearer put on demonstration spectacles of a design that the wearer selects;

(2) taking a round decal having perpendicular bisecting lines and affixing the decal to a lens of the demonstration spectacles so that as closely as possible an intersecting point of the bisecting lines coincides with the center of the wearer's pupil; and (3) comparing by observation whether the intersecting point coincides with the center of the wearer's pupil and if not repositioning the decal so that it does.

6. An apparatus for use in connection with fitting wearers of multifocals with multifocals that are properly positioned in a lens, comprising:

a transparent soft plastic form capable of removably adhering to plastic and glass, shaped in the design of a substantially semicircular lower portion of a spectacle lens, having a flat horizontal top, and whose vertical distance from the flat top to a lowest point on a curved bottom portion corresponds to a height for a multifocal lens segment, wherein a surface of said soft plastic form adheres to a surface of said plastic and glass without adhesive after the surface of said soft plastic form is placed adjacent to and pressed against said plastic and glass to create an air-tight fit so that a suction force is created.

7. An apparatus for use in connection with fitting wearers of multifocals with multifocals that are properly positioned in a lens, comprising:

a transparent soft plastic form capable of removably adhering to plastic and glass, shaped in the design of a substantially semicircular lower portion of a spectacle lens, having a flat horizontal top, and whose vertical distance from the flat top to a lowest point on a curved bottom portion corresponds to a height for a multifocal lens segment, wherein a surface of said soft plastic form adheres to a surface of said plastic and glass without adhesive after the surface of said soft plastic form is placed adjacent to and pressed against said plastic and glass to create an air-tight fit so that a frictional force is created.

8. An apparatus for use in connection with fitting wearers of multifocals with multifocals that are properly positioned in a lens, comprising:

a transparent soft plastic form capable of removably adhering to plastic and glass, shaped in the design of a substantially semicircular lower portion of a spectacle lens, having a flat horizontal top, and whose vertical distance from the flat top to a lowest point on a curved bottom portion corresponds to a height for a multifocal lens segment, wherein a surface of said soft plastic form can adhere to and be stored on a surface of a roll of tape without adhesive.

9. An apparatus for use in connection with fitting wearers of multifocals with multifocals that are properly positioned in a lens, comprising:

a transparent soft plastic form capable of removably adhering to plastic and glass, shaped in the design of a substantially semicircular lower portion of a spectacle lens, having a flat horizontal top, and whose vertical distance from the flat top to a lowest point on a curved bottom portion corresponds to a height for a multifocal lens segment, wherein a surface of said soft plastic form adheres to a surface of said plastic and glass without adhesive after the surface of said soft plastic form is placed adjacent to and pressed against said plastic and glass to create an air-tight fit so that a suction force is created and wherein a surface of said soft plastic form can adhere to and be stored on a surface of a roll of tape without adhesive.

10. An apparatus in accordance with claim 9 and wherein the plastic form corresponds in width to that of the spectacle lens.

11. An apparatus for use in connection with fitting wearers of multifocals with multifocals that are properly positioned in a lens, comprising:

a transparent soft plastic form capable of removably adhering to plastic and glass, shaped in the design of a substantially semicircular lower portion of a spectacle lens, having a flat horizontal top, and whose vertical distance from the flat top to a lowest point on a curved bottom portion corresponds to a height for a multifocal lens segment, wherein a surface of said soft plastic form adheres to a surface of said plastic and glass without adhesive after the surface of said soft plastic form is placed adjacent to and pressed against said plastic and glass to create an air-tight fit so that a frictional force is created, wherein a surface of said soft plastic form can adhere to and be stored on a surface of a roll of tape without adhesive.

12. An apparatus in accordance with claim 11, wherein the plastic form corresponds in width to that of the spectacle lens.

13. An apparatus for use in connection with fitting wearers of multifocals with multifocals that are properly positioned in a lens, comprising:

a transparent soft plastic form capable of removably adhering to a surface of plastic and glass to create an air-tight fit without adhesive so as to create suction and which can adhere to and be stored on a plastic tape without adhesive, the plastic form being shaped in a round circle for placement on a portion of a spectacle lens, and having a diameter corresponding to a height for a multifocal lens segment.

14. An apparatus for use in connection with fitting wearers of multifocals with multifocals that are properly positioned in a lens, comprising:

a transparent soft plastic form capable of removably adhering to a surface of plastic and glass to create an air-tight fit without adhesive so as to create friction and which can adhere to and be stored on a plastic tape without adhesive, the plastic form being shaped in a round circle for placement on a portion of a spectacle lens, and having a diameter corresponding to a height for a multifocal lens segment.

* * * * *